US010603813B2

(12) United States Patent
Vanderminden (10) Patent No.: US 10,603,813 B2
(45) Date of Patent: Mar. 31, 2020

(54) PRODUCTS HAVING A WOOD GRAIN APPEARANCE, AND METHODS AND STRUCTURES FOR USE IN FORMING SAME

(71) Applicant: Telescope Casual Furniture, Inc., Granville, NY (US)

(72) Inventor: William M. Vanderminden, Queensbury, NY (US)

(73) Assignee: Telescope Casual Furniture, Inc., Granville, NY (US)

( * ) Notice: Subject to any disclaimer, the term of this patent is extended or adjusted under 35 U.S.C. 154(b) by 541 days.

(21) Appl. No.: 15/295,607

(22) Filed: Oct. 17, 2016

(65) Prior Publication Data
US 2018/0104847 A1    Apr. 19, 2018

(51) Int. Cl.
*B27N 3/28* (2006.01)
*B32B 27/08* (2006.01)
(Continued)

(52) U.S. Cl.
CPC ............ *B27N 3/28* (2013.01); *B29C 48/0011* (2019.02); *B29C 48/0019* (2019.02);
(Continued)

(58) Field of Classification Search
CPC ....................................................... B27N 3/28
See application file for complete search history.

(56) References Cited

U.S. PATENT DOCUMENTS 2,379,006 A    6/1945  Johnson
5,093,162 A    3/1992  Fenton et al.
(Continued)

FOREIGN PATENT DOCUMENTS

JP    H02 106345 A    4/1990
WO    WO 2011085518    7/2011
WO    WO 2011085554    7/2011

OTHER PUBLICATIONS

Modified wood product aims to save hardwood forests from the axe, Envirothink, printout available online on Oct. 6, 2016 at https://envirothink.wordpress.com/2016/09/14/modified-wood-product-aims-to-save-hardwood-forests-from-the-axe/, 2 pages, Sep. 16, 2016.
(Continued)

*Primary Examiner* — William P Watkins, III
(74) *Attorney, Agent, or Firm* — Heslin Rothenberg Farley and Mesiti PC (57) ABSTRACT

Structures for use in forming products having a wood grain appearance include, for example, a plurality of extruded layers having different colors/shades spirally wound about a longitudinal axis to an outer surface to define the structure. The plurality of extruded layers include varying thicknesses along a spiral length of the plurality of layers and/or portions of the plurality of extruded layers encircling the longitudinal axis include portions disposed at different distances from the longitudinal axis. In some embodiments, the spirally winding includes forming a cylindrical structure, and pressing the cylindrical structure into a cuboid structure having a square or rectangular cross-section across the longitudinal axis and at least a portion of the plurality of extruded layers defining a square or rectangle pattern across the longitudinal axis. Longitudinal portions may be cut from the structures to form the products having a wood grain appearance.

33 Claims, 10 Drawing Sheets

(51) Int. Cl.

| | | |
|---|---|---|
| *B32B 27/32* | (2006.01) | |
| *B29C 53/56* | (2006.01) | |
| *B29C 48/00* | (2019.01) | |
| *B29C 48/21* | (2019.01) | |
| *B32B 3/26* | (2006.01) | |
| *B32B 7/12* | (2006.01) | |
| *B32B 1/00* | (2006.01) | |
| *B32B 37/14* | (2006.01) | |
| *B32B 21/02* | (2006.01) | |
| *B32B 27/18* | (2006.01) | |
| *B32B 21/13* | (2006.01) | |
| *B29C 48/18* | (2019.01) | |
| *B29K 23/00* | (2006.01) | |
| *B29K 105/16* | (2006.01) | |
| *B29K 511/14* | (2006.01) | |
| *B29L 31/10* | (2006.01) | |

(52) U.S. Cl.
CPC .......... *B29C 48/0022* (2019.02); *B29C 48/18* (2019.02); *B29C 48/21* (2019.02); *B29C 53/562* (2013.01); *B32B 1/00* (2013.01); *B32B 3/263* (2013.01); *B32B 7/12* (2013.01); *B32B 21/02* (2013.01); *B32B 21/13* (2013.01); *B32B 27/08* (2013.01); *B32B 27/18* (2013.01); *B32B 27/32* (2013.01); *B32B 37/14* (2013.01); *B29K 2023/065* (2013.01); *B29K 2105/16* (2013.01); *B29K 2511/14* (2013.01); *B29K 2995/0021* (2013.01); *B29L 2031/10* (2013.01); *B32B 2250/242* (2013.01); *B32B 2264/067* (2013.01); *B32B 2307/4026* (2013.01); *B32B 2307/712* (2013.01); *B32B 2307/732* (2013.01); *B32B 2479/00* (2013.01)

(56) References Cited

U.S. PATENT DOCUMENTS

| | | |
|---|---|---|
| 5,869,138 A | 2/1999 | Nishibori |
| 8,268,430 B2 | 9/2012 | Johnson et al. |
| 2005/0124441 A1 | 6/2005 | Rotten et al. |
| 2007/0187348 A1 | 8/2007 | Malekmadani |
| 2008/0274293 A1* | 11/2008 | Hart .................. B29D 11/00009 427/402 |
| 2010/0178451 A1 | 7/2010 | Li |
| 2015/0290870 A1 | 10/2015 | Philpot et al. |

OTHER PUBLICATIONS

Nick Carne, Second-generation strand woven bamboo technology allows any type of timber to be used, The Lead, printout available online on Oct. 6, 2016 at http://www.theleadsouthaustralia.com.au/industries/technology/secondgeneration-strand-woven-bamboo-technology-allows-any-type-of-timber-to-be-used/?sstat=8694, 3 pages, Jul. 28, 2015.

Robert Dalheim, Engineered hardwood announcement spawns doubt, excitement, and curiosity, Woodworking Network, printout available online on Oct. 12, 2016 at http://www.woodworkingnetwork.com/wood/pricing-supply/announcement-engineered-australian-tropical-hardwood-brought-raft-comments, 3 pages, Sep. 27, 2016.

Rutland Plywood Corp., Dymondwood Brochure, 14 pages, at least as early as Apr. 30, 2013.

WebbWood™ Engineered Laminated Birch, available from D.B. Webb, Inc., Leicester, New York, printout available online on Oct. 12, 2016 at https://webbwood.com/about_webbwood.php, 7 pages, Oct. 12, 2016.

Eon products, Gracious Living Corporation, Woodbridge, Ontario, Canada, printout available online on Oct. 12, 2016 at http://www.eonoutdoor.com/, 3 pages, Oct. 12, 2016.

Cascade Table, available from Klaussner Outdoor by Klaussner Home Furnishings, Asheboro, North Carolina, Klaussner Outdoor Select 2016 Catalog, available online on Oct. 12, 2016, at https://issuu.com/klaussner/docs/select_outdoor_2016_catalog, 4 pages, at least as early as Oct. 12, 2016.

Select by Polywood, available from Poly-Wood, LLC., Syracuse, Indiana, printout available on Oct. 12, 2016, at http://select.polywoodinc.com/, 5 pages, at least as early as Sep. 5, 2016.

Polywood Select Chairs, available from Poly-Wood, LLC., Syracuse, Indiana, 8 images, 2 pages, at least as early as Oct. 14, 2016.

William Vanderminden, International Search Report and Written Opinion, International Application No. PCT/US2017/056741, 10 pages, dated Dec. 15, 2017.

William Vanderminden, International Application No. PCT/US2017/056741, 33 pages, dated Oct. 16, 2017.

\* cited by examiner

PRODUCTS HAVING A WOOD GRAIN APPEARANCE, AND METHODS AND STRUCTURES FOR USE IN FORMING SAME

FIELD OF THE DISCLOSURE

The present disclosure relates generally to manufactured products, and more particularly to products having a wood grain appearance, and methods and structures for use in forming products having a wood grain appearance.

BACKGROUND

Traditionally, wood has been an attractive material for furniture design. Generally, wood does not stand up to outdoor use well in the long term unless tropical hardwoods like Teak are used.

One attempt to make products that look like wood but that can stand up better to outdoor use compared to real wood includes applying a coating having a wood grain appearance on to a substrate such as metal.

Another attempt to make products that look like wood but that can stand up better to outdoor use compared to real wood includes profile extrusion and injection molding of a polymeric material and introducing a different color material before the extrusion or injection. The introduced different color material results in "streakers" that gave an outer surface having a simulated wood grain appearance.

SUMMARY

Shortcomings of the prior art are overcome and additional advantages are provided through the provision, in one embodiment, of a structure for use in forming a plurality of products having a wood grain appearance. The structure includes, for example, a plurality of extruded layers having different colors/shades spirally wound about a longitudinal axis to an outer surface to define the structure. The plurality of extruded layers comprise varying thicknesses along a spiral length of the plurality of layers and/or portions of the plurality of extruded layers encircling the longitudinal axis comprising portions disposed at different distances from the longitudinal axis.

In another embodiment, a method for forming a structure for use in forming products having a wood grain appearance is provided. The method includes, for example, extruding a plurality of layers having different colors/shades, and spirally winding the extruded plurality of layers about a longitudinal axis outwardly to an outer surface to define the structure.

In another embodiment, a cuboid structure for use in forming a plurality of products having a wood grain appearance is provided. The cuboid structure includes, for example, a plurality of layers overlaying each other and wound about a longitudinal axis a plurality of times outwardly to an outer surface to define the cuboid structure. The plurality of layers include different colors/shades.

In another embodiment, a structure for use in forming a plurality of products having a wood grain appearance is provided. The structure includes, for example, three or more layers overlaying each other and wound about a longitudinal axis a plurality of times outwardly to an outer surface to define the structure. The three or more layers include a first layer having a first thickness and a first color/shade, a second layer having a second thickness and a second color/shade, and a third layer having a third thickness and a third color/shade. The first color/shade is lighter than the second color/shade and is lighter than the third color/shade.

In another embodiment, a method for forming a structure for use in forming products having a wood grain appearance is provided. The method includes, for example, assembling a plurality of layers overlaying each other and wound about a longitudinal axis a plurality of times to an outer surface to define the structure. The plurality of layers includes different colors/shades.

In another embodiment, a method for forming a structure for use in forming products having a wood grain appearance is provided. The method includes, for example, assembling three or more layers overlaying each other and wound about a longitudinal axis a plurality of times outwardly to an outer surface to define the structure. The three or more layers include a first layer having a first thickness and a first color/shade, a second layer having a second thickness and a second color/shade, and a third layer having a third thickness and a third color/shade. The first color/shade is lighter than the second color/shade and is lighter than the third color/shade.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the disclosure in detail. It should be understood, however, that the detailed description and the specific examples, while indicating embodiments of the present disclosure, are given by way of illustration only, and are not by way of limitation. Various substitutions, modifications, additions and/or arrangements within the spirit and/or scope of the underlying concepts will be apparent to those skilled in the art from this disclosure. Reference is made below to the drawings, which are not drawn to scale for ease of understanding, wherein the same reference numbers used throughout different figures designate the same or similar components.

Figure 1:
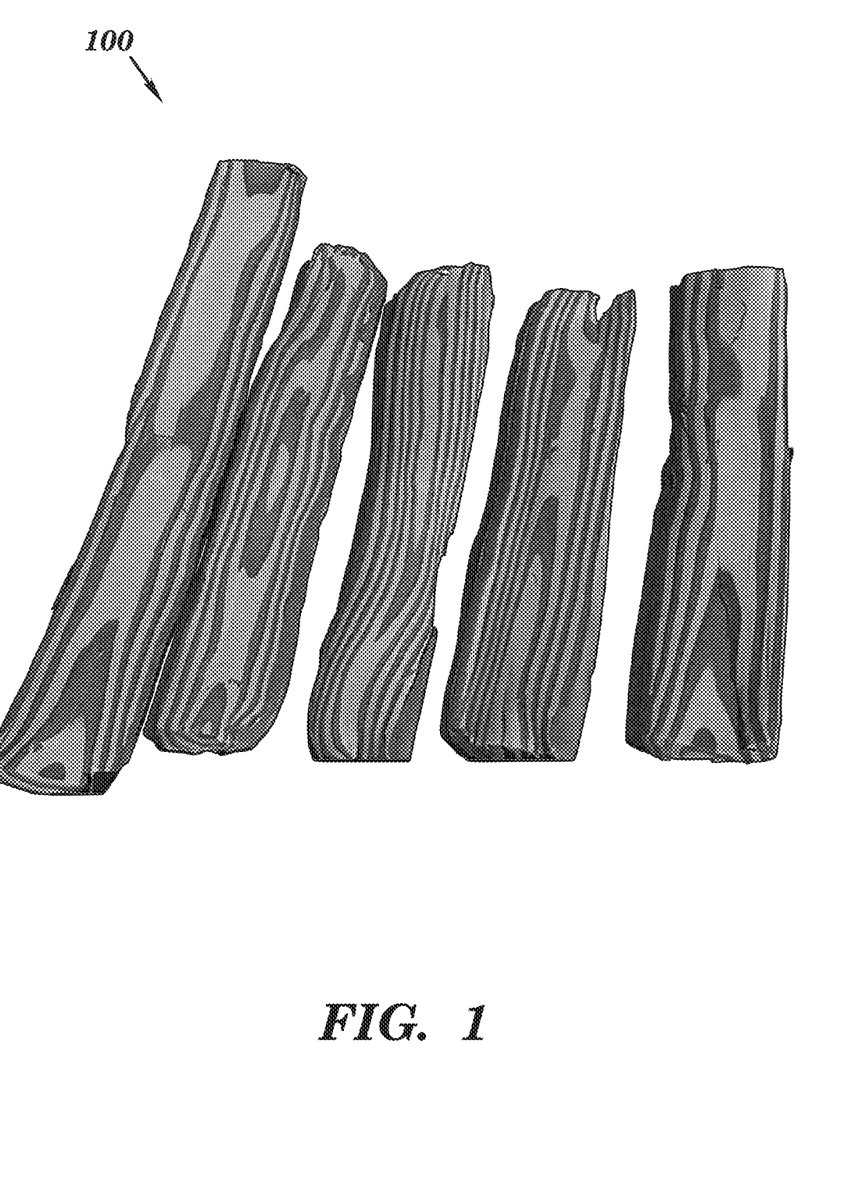
FIG. 1 are perspective views of products formed having a wood grain appearance according to an embodiment of the present disclosure.

FIG. 1 illustrates a plurality of products 100 having a wood grain appearance according to an embodiment of the present disclosure. Products 100 may have outer surfaces and ends having a wood grain appearance and in which the wood grain appearance also extends through the product itself. As described further below, employing two or more different colored materials allows for forming products having a wood grain appearance. In some embodiments, the products may be formed from polymeric or plastic materials. As described further below, employing two or more different colored polymeric or plastic materials allows for realistic products having a wood grain appearance. For example, products 100 may be boards, panels, sheets, veneers, and/or other products having, for example, a width, a length, and a thickness, an/or other configuration. Such boards, panels, sheets, veneers, and/or other products may be readily used and assembled in the fabrication of articles of manufacture such as outdoor furniture. As described below, forming structures having wound layers of different color layers, different thickness, and/or varying locations and thicknesses of the wound layers may allow for forming products having a more realistic wood grain appearance.

FIGS. 2-5 diagrammatically illustrate a method for forming products (such as products 100 as shown in FIG. 1) having a wood grain appearance according to an embodiment of the present disclosure.

Figure 2:
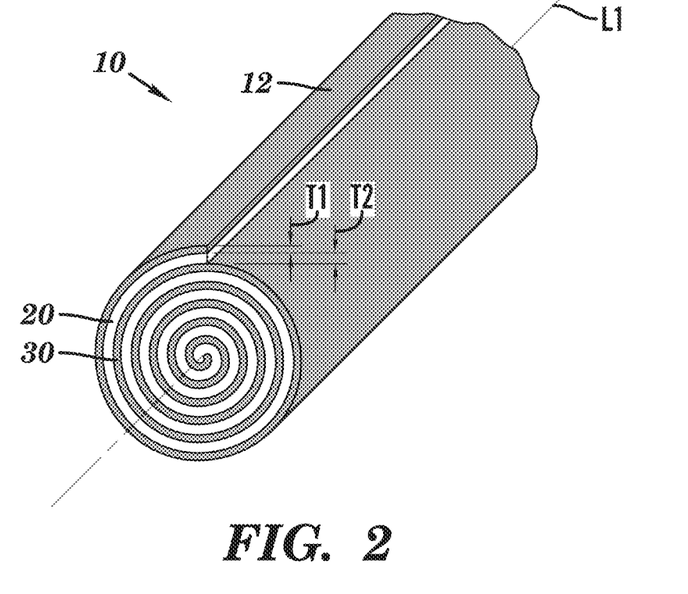
FIGS. 2-5 is a diagrammatic illustration of a method for forming a product having a wood grain appearance according to an embodiment of the present disclosure.

With reference to FIG. 2, a structure 10 for use in forming products having a wood grain appearance may include a plurality of layers 20 and 30 overlaying each other and wound, such as spirally wound, about a longitudinal axis L1 of structure 10 outwardly to an outer surface 12. In some embodiments, structure 10 may be formed from a plurality of layers of polymeric material such as a plurality of layers of extruded polymeric materials. Structure 10 may be initially formed and shaped into a cylinder or an elongated cylindrical structure having a circular cross-section. As illustrated in FIG. 2, plurality of layers 20 and 30 may include different colors/shades and the same or different thicknesses. For example, layer 30 may have a thickness T1, and layer 20 may have a thickness T2. Thickness T2 may be greater than thickness T1. Layer 20 may be a lighter color/shade than the color/shade of layer 30.

Figure 3:
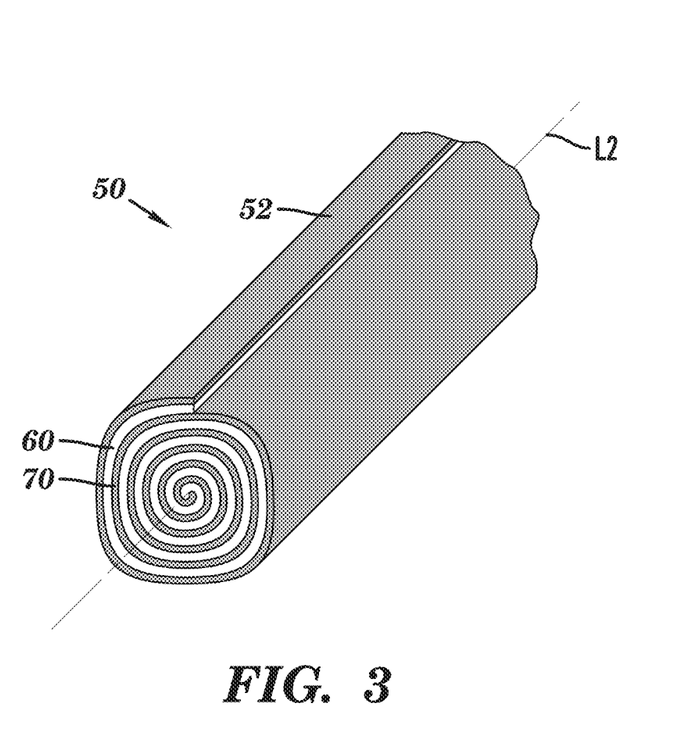

As shown in FIG. 3, cylindrical structure 10 (FIG. 2) may be formed into a cuboid structure 50 having a plurality of layers 60 and 70 overlaying each other and disposed about a longitudinal axis L2 of structure 50 outwardly to an outer surface 52. For example, cuboid structure 50 may be an elongated cuboid structure such as a rectangular cuboid structure having a square or rectangular cross-section across longitudinal axis L2. Cylindrical structure 10 (FIG. 2) may be pressed or placed in a mold to form cuboid shaped structure 50. As shown in FIG. 3, an encircling portion of one of the wound layers disposed around longitudinal axis L2 of layers 60 and 70 may be disposed at varying positions, locations, and distances relative to longitudinal axis L2. For example, an encircling portions of the wound layers around longitudinal axis L2 of layers 60 and 70 may have a square or rectangular pattern or configuration, e.g., the outer spiral wound layers may have square or rectangular pattern or configurations.

Figure 4:
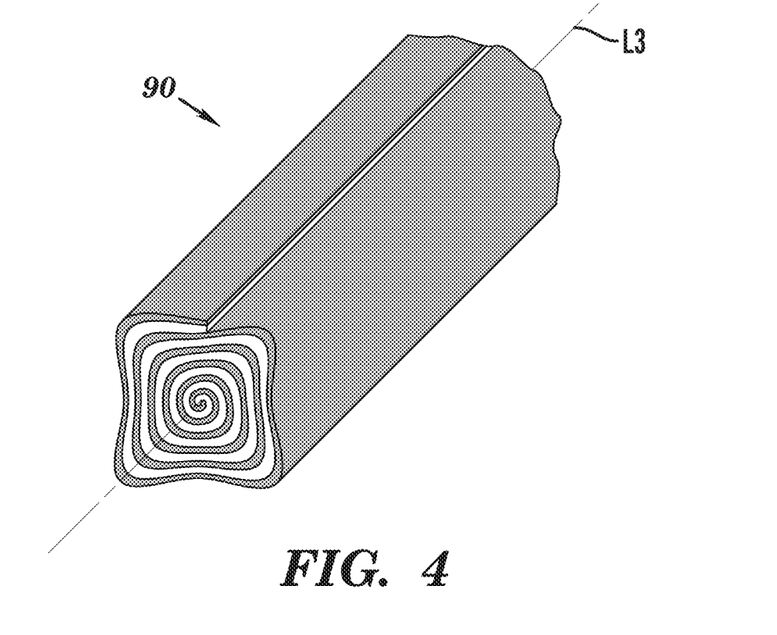

Cylindrical structure 10 (FIG. 2) and cuboid structure 50 may be formed from a heated polymeric or plastic layers of materials such as extruded layers of material. Upon cooling, cuboid structure 50 may cool at different rates throughout its thickness. For example, the corners may cool faster than the center of the cuboid structure resulting in portions of the sides of the cuboid structure extending inward relative to the corners and forming a cuboid structure 90 as shown in FIG. 4. Such an effect due to the unequal or irregular cooling may impart randomness in the position, location, or distance of the wound layers relative to the longitudinal axis, which randomness may result in products having a more realistic wood grain appearance. As shown in FIG. 4, portions of the layers through the thickness may curve inwardly toward a longitudinal axis L3.

Figure 5:
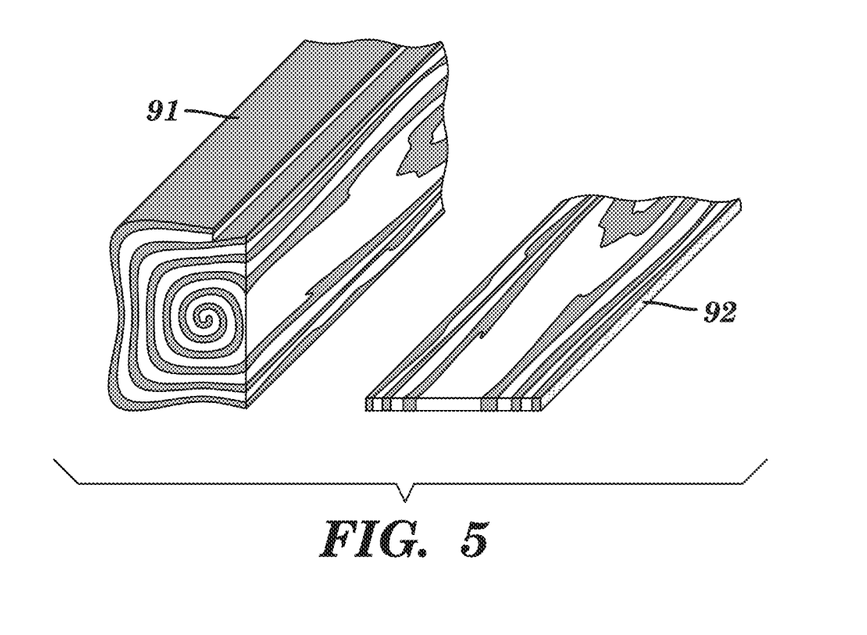

FIG. 5 illustrates a portion 92 operably longitudinally cut from cuboid shaped structure 90 (FIG. 4) along with a remainder portion 91 of the cuboid shaped structure. For example, one or more cut portions may be products such as boards, panels, sheets, veneers, and/or other products. As will be appreciated, such products have outer surfaces and ends having a wood grain appearance and a wood grain appearance extending through the product. Thus, if the cut products are subsequently planed, sanded, further cut, or otherwise processed, the planed, sanded, further cut, or processed surfaces would still be provided with outer surfaces having a wood grain appearance.

Figure 6:
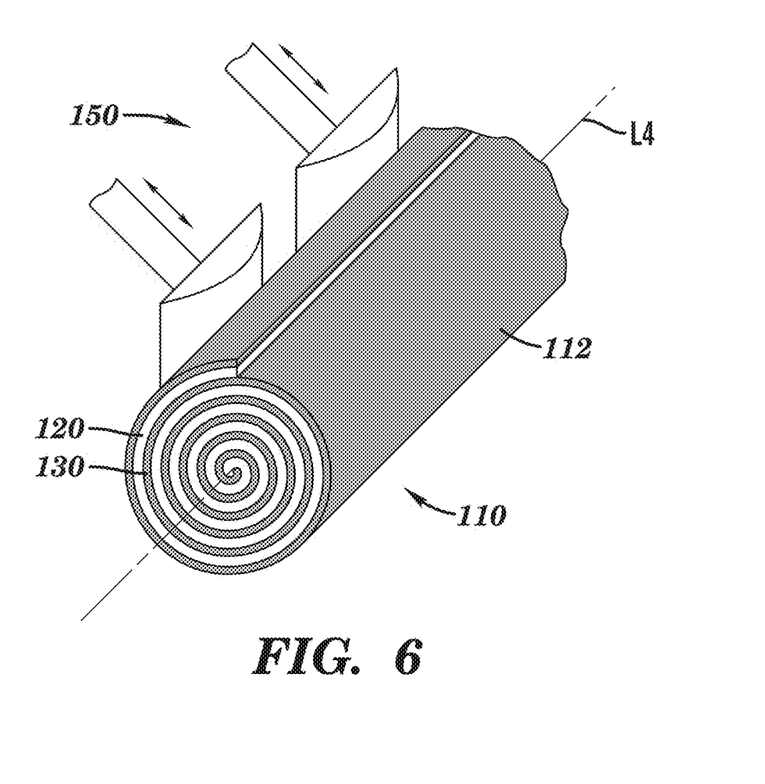
FIGS. 6 and 7 are diagrammatic illustrations of a method for use in forming structures for forming products having a wood grain appearance according to an embodiment of the present disclosure.
Figure 7:
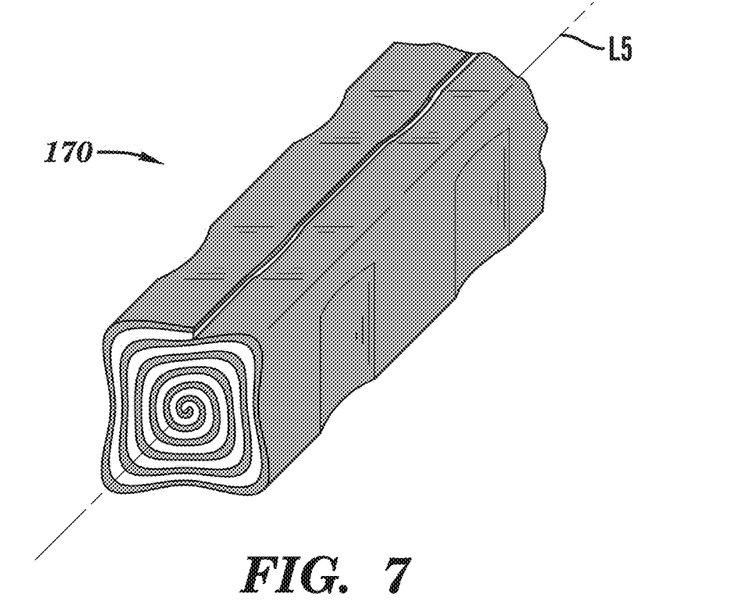

FIGS. 6 and 7 diagrammatically illustrate a method for use in forming structures for forming products having a wood grain appearance according to an embodiment of the present disclosure. For example, as shown in FIG. 6, a structure 110 for use in forming products having a wood grain appearance may include a plurality of layers 120 and 130 overlaying each other and wound, such as spirally wound, about a longitudinal axis L4 of structure 110 outwardly to an outer surface 112. Structure 110 may be the same as structure 10 (FIG. 2) such as formed from a heated polymeric or plastic layers of materials such as extruded layers of material.

A plurality of rams 150 may be operably employed of deform structure 110 to impart variations in the location and/or position of the layers within structure 110. For example, rams 150 may be various guided pieces for exerting pressure or for driving or forcing structure 110 by impact. The plurality of rams 150 may initially act on a side of the structure, the structure may be turned or the rams moved to act on a different side of the structure. In another embodiment, a plurality of rams may be disposed, for example, for acting on 2 or 4 sides of the structure at the same time or at different times.

FIG. 7 illustrates a structure 170 formed employing the rams 150 (FIG. 6) and cooled. Each spiral of layers in structure 10 (FIG. 2) and structure 110 (FIG. 6) generally remain at constant longitudinal distances, locations and/or positions relative to longitudinal axis L1 and longitudinal axis L4, respectively. As will be appreciated, the layers in structure 170 are disposed at varying longitudinal locations and/or positions relative to a longitudinal axis L5. Such varying locations and/or positions of the layers, when cut, result in products having a more varied and realistic wood grain appearance. As described below, a thickness of the spiral wound layers may be varied in a direction of the spiral, and/or a force applied by the rams onto a structure may be varied or randomly controlled, and/or the longitudinal position of the rams varied or randomly controlled, to cause a more random pattern or disruption of the locations and/or positions of the spiral wound layers throughout a structure. It will be appreciated that other processes may be employed to impart deformation or deflection of the layers within a structure.

Figure 8:
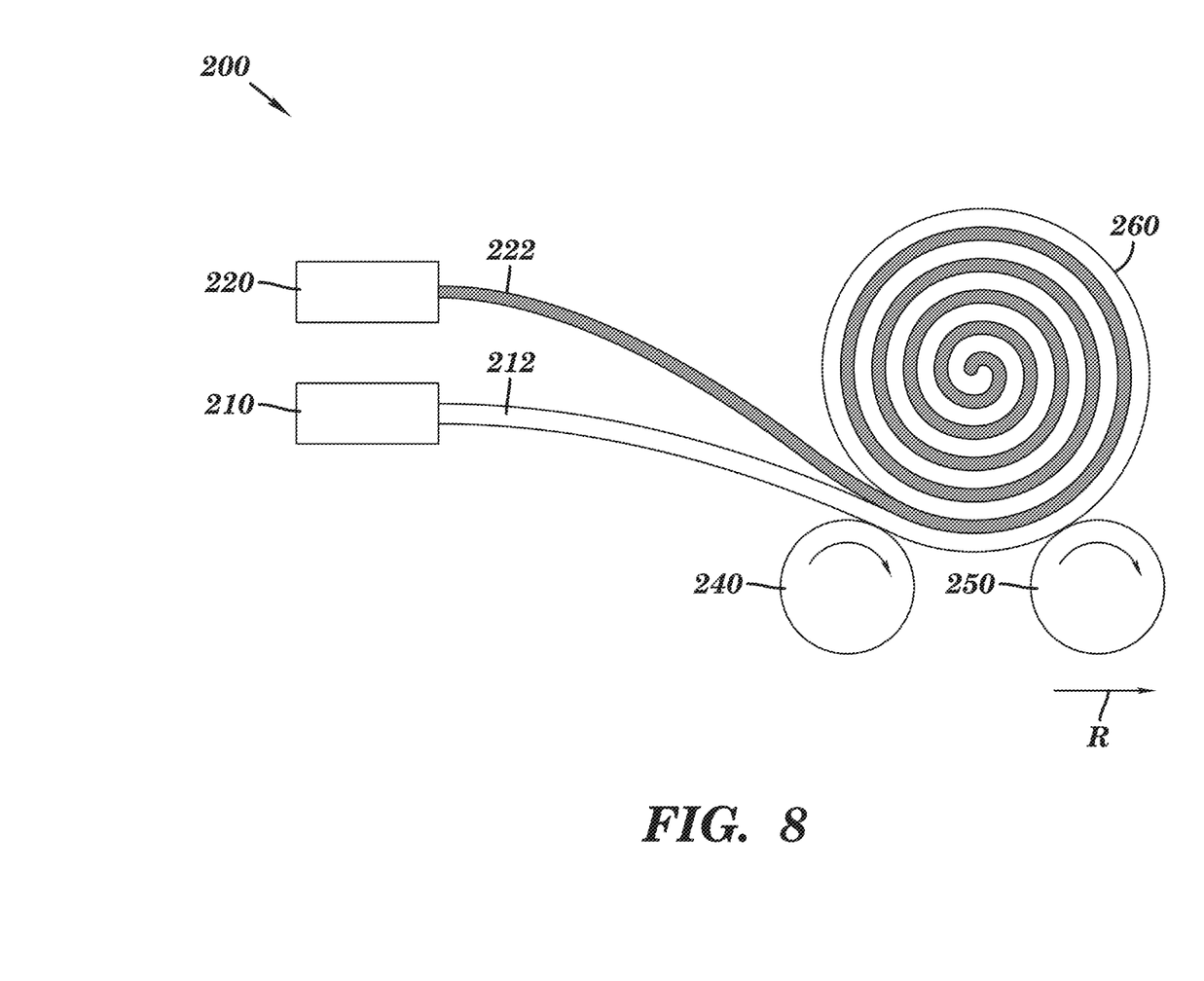
FIG. 8 is a diagrammatic illustration of an apparatus for forming structures for use in forming products having a wood grain appearance according to an embodiment of the present disclosure.

FIG. 8 diagrammatically illustrates an apparatus 200 for forming structures for use in forming products having a wood grain appearance according to an embodiment of the present disclosure. Apparatus 200 may include a first extruder 210 and a second extruder 220, which feed material onto a first roller 240 and a second roller 250. The extruders may be disposed one on top of another. For example, first extruder 210 may extrude a first layer 212, and second extruder 220 may extrude a second layer 222. Second layer 222 may be received on first layer 212. Rollers 240 and 250 may receive the overlapping extruded layers and form or continuously wind the extruded layers into a spirally wound roll 260. Rollers 240 and 250 may be movable away from each other, e.g., roller 250 may move in the direction of arrow R as roll 260 is being formed. The plurality of layers may have different colors/shades and different thicknesses.

Figure 9:
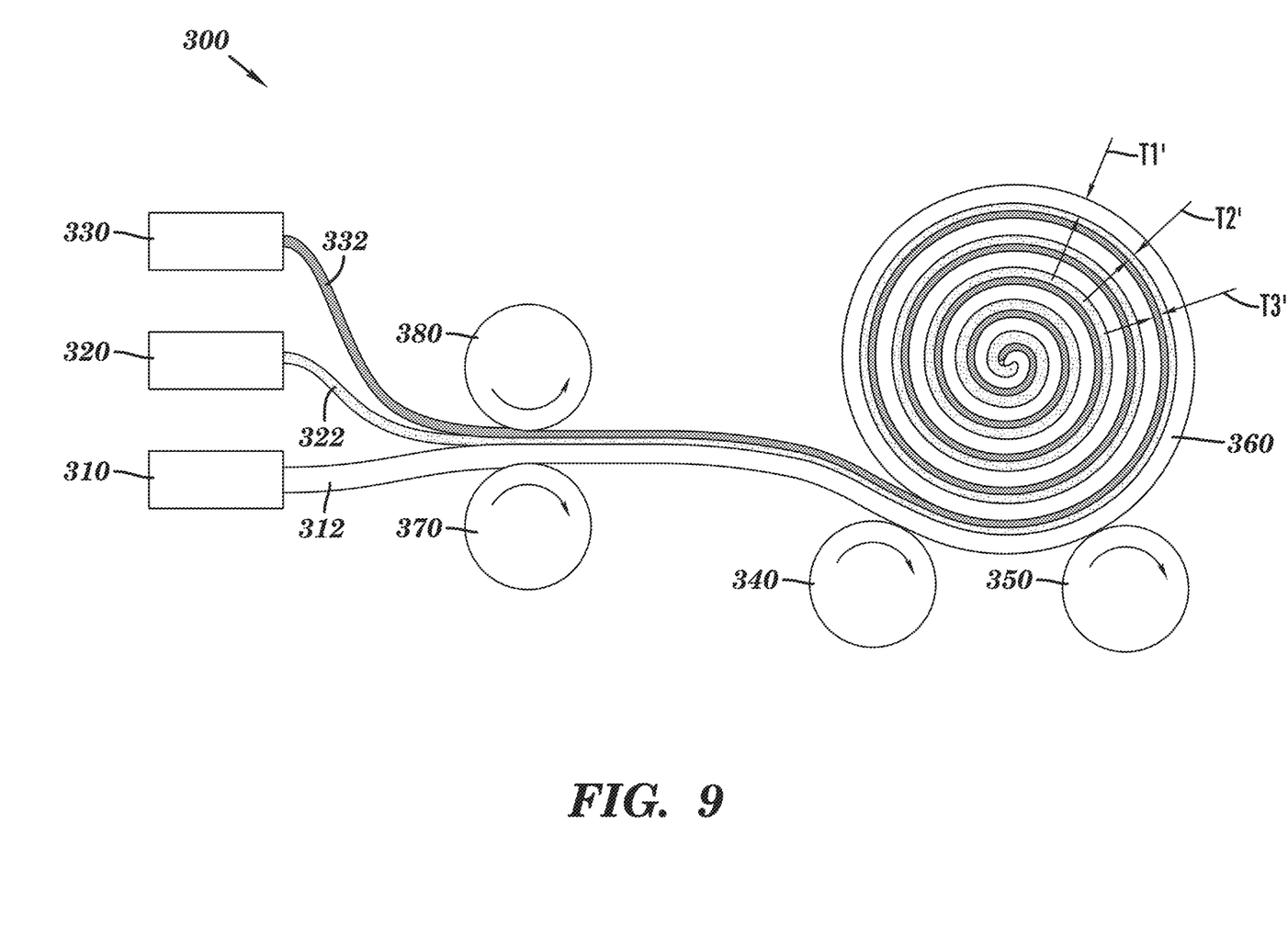
FIG. 9 is a diagrammatic illustration of an apparatus for forming structures for use in forming products having a wood grain appearance according to an embodiment of the present disclosure.

FIG. 9 diagrammatically illustrates an apparatus 300 for forming structures for use in forming products having a wood grain appearance according to an embodiment of the present disclosure. Apparatus 300 may include a first extruder 310, a second extruder 320, and a third extruder 330, which extruders feed material between a nip of a first roller 370 and a second roller 380. The extruders may be disposed one on top of another. For example, first extruder 310 may extrude a first layer 312, second extruder 320 may extrude a second layer 322, and third extruder 330 may extrude a third layer 332. Second layer 322 may be received on first layer 312, and third layer 332 may be received on second layer 322. Rollers 370 and 380 may compress and reduce the thickness of the three extruded layers, which may aid in bonding the layers together. Also the width of the extrude layers may increase after passing through the nip of rollers 370 and 380. Rollers 340 and 350 may receive the three overlapping compressed extruded layers and form or continuously wind the extruded layers into a spiral wound roll 360. The plurality of layers may have different colors and different thicknesses. It will be appreciated that more than three extruders may be employed in forming a structure for use in forming products such as products having a wood grain appearance.

Figure 10:
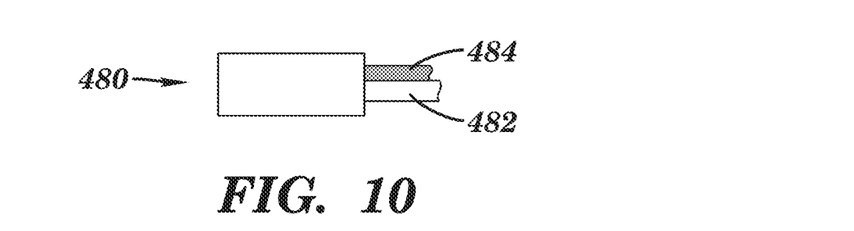
FIG. 10 is a diagrammatic illustration of a coextruder for forming structures for use in forming products having a wood grain appearance according to an embodiment of the present disclosure.
Figure 11:
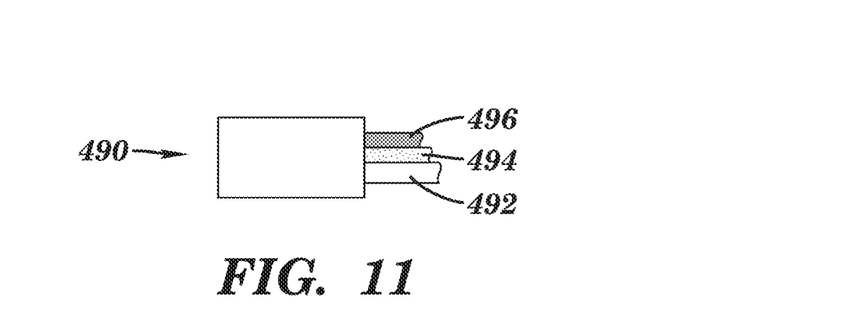
FIG. 11 is a diagrammatic illustration of a coextruder for forming structures for use in forming products having a wood grain appearance according to an embodiment of the present disclosure.

FIG. 10 diagrammatically illustrates a coextruder 480 for operably extruding a plurality of layers 482 and 484. FIG. 11 diagrammatically illustrates a coextruder 490 for operably extruding a plurality of layers 492, 494, and 496. Coextruders 480 and 490 may be operably employed in the apparatus shown in FIGS. 8 and 9.

Figure 12:
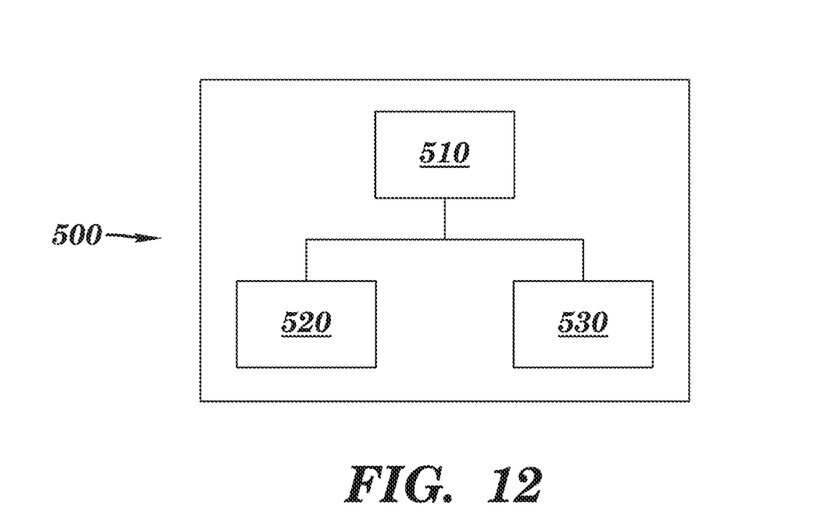
FIG. 12 is a diagrammatic illustration of a controller for use in forming structures for use in forming products having a wood grain appearance according to an embodiment of the present disclosure.

FIG. 12 illustrates a computing unit or controller 500 that may be employed in a method for forming structures for use in forming products having a wood grain appearance according to an embodiment of the present disclosure. For example, controller 500 may be operably employed in apparatus 200 (FIG. 8), apparatus 300 (FIG. 9), coextruder 480 (FIG. 10), coextruder 490 (FIG. 11), and/or in control of rams 150 (FIG. 6). Controller 500 may be any type of computing unit or controller having a processor 510, a memory 520 and input/output devices 530. For example, controller 500 may variably or randomly control the thicknesses of the extrusions of the various layers as the layers are extruded and/or the deformation of the spiral wound structures so that the spiral layers in the structure may be varied or randomly varied in the direction of the spiral, and relative to the longitudinal axis to cause a more random pattern of the locations and/or positions of the spiral wound layers throughout the structure. Typically, the thickness of initial extrusions are not constant and often form waste. However, in accordance with the present disclosure, such initial extrusions may be desirable in resulting in products having a more random appearance.

In some embodiments, the first layer may be the thickest and have the lightest color/shade representing the high growth phase of a tree in the spring. The second layer may have a medium color/shade that represents the slowing growth phase of the early to mid-summer, and the third layer may have a dark color/shade that represent the slow growth phase of the late summer and fall months. As illustrated in FIG. 9, the plurality of layers 312, 322, and 332 may include different colors/shades and different thicknesses. For example, layer 312 may have a thickness T1', layer 322 may have a thickness T2', and layer 332 may have a thickness T3'. Thickness T1' may be greater than thickness T2' and greater than thickness T3'. Layer 312 may be a lighter color/shade than layer 322 and layer 332.

The combined thickness of the layers may be about ⅛ inch (about 3.2 millimeters) to about 1 inch (about 25.4 millimeters), about ⅛ inch (about 3.2 millimeters) to about ¾ inch (about 19.1 millimeters), about ⅛ inch (about 3.2 millimeters) to about ½ inch (about 12.7 millimeters), about ⅛ inch (about 3.2 millimeters) to about ⅜ inch (about 9.5 millimeters), about ⅛ inch (about 3.2 millimeters), about ¼ inch (about 6.4 millimeters), about ⅜ inch (about 9.5 millimeters), about ½ inch (about 12.7 millimeters), about ¾ inch (about 19.1 millimeters), about 1 inch (about 25.4 millimeters), or other suitable thickness. The lightest color/shade of the layers may have a thickness of about 1/16 inch (about 1.6 millimeters) to about 3/16 inch (about 4.8 millimeters), about ⅛ inch (about 1.3 millimeters), or other suitable thickness. The medium and dark colors/shades of the layers may have a thickness of about 0.025 inch (about 0.6 millimeters) to about 0.075 inch (about 2 millimeters), about 0.05 inch (about 1.3 millimeters), or other suitable thickness.

As the spirally wound layers are generally thin compared to the overall dimensions of the roll produced, the spirally wound layers provide a realistic appearance of wood having annular tree rings in products cut from the roll. It will be appreciated that the technique of the present disclosure may be operable with only two layers having different colors and the same or different thicknesses. For example, one layer being thicker and having a light color/shade, and the other layer being thinner and having a darker color/shade. It will be appreciated that the technique of the present disclosure may be operable with three or more layers of different colors/shades and/or thicknesses. For example, one layer may be thicker and have a lighter color/shade compared to the two or more other layers having a thinner and darker color/shade. The colors/shades of the layers may be brown, red, yellow, gray, orange that represent natural wood grain colors/shades. Other colors/shades may be employed such as blue, green, purple, fluorescent, or other colors that may represent wood grain products being stained or painted.

In some embodiments, an apparatus according to the present disclosure may be operable to roll a multicolored sheet (e.g., formed from two, three or more layers) of polymeric or plastic material such as about ¼ inch (about 6.4 millimeters) thick and about 8 feet wide or more into a large roll of perhaps about 6 feet in diameter to about 8 feet in diameter as it exits the extruder so that the layers bond or weld together.

Once the roll reaches a suitable diameter, the roll may be cut and moved off line so a new roll may be started. The removed cylindrical roll may still be at an elevated temperature and may be moved into a press which press may compress the roll from two directions forcing it into a cuboid structure.

As will be appreciated, squaring up of the cylindrical roll reduces waste as portions of the cuboid shaped structure are later cut into products such as boards, panels, sheets, veneers, and/or other products. As will also be appreciated, forming the cylindrical roll in to a cuboid shaped structure imparts variability in the layers so that the cut boards, panels, sheets, veneers, and/or other products have are more random and natural looking and less regular wood grain pattern. The combination of reshaping and the uneven cooling rates of the outside edges and ends compared to the center of the cuboid shaped structure may create variability in the layers, and may make the subsequent cut boards, panels, sheets, veneers, and/or other products having a more interesting and realistic wood grain appearance.

In other embodiments, a plurality of layers overlaying each other and spirally wound about a longitudinal axis of structure outwardly to an outer surface may be formed directly into a cuboid structure, e.g., without first forming a cylindrical structure. For example, the plurality of layers may be initially operably formed having flat sides disposed 90 degrees from each other, which flat sides are maintained as the cuboid structure is formed. In other embodiments, a formed solid mandrel may have an innermost spiral of the layers, which formed solid mandrel is used to form the remaining portion of the roll.

After the cuboid shaped structure is completely cooled, it can be stored for any length of time. As orders are received, boards, panels, sheets, veneers, and/or other products may be cut or sliced having any desired thickness using, for example, a band saw. The cut boards, panels, sheets, veneers, and/or other products may then be run through a planer or bed sanders for the desired surface finish. Cut boards may have a thickness corresponding to standard or full size boards such as ½ inch, ⅝ inch, ¾ inch, 1 inch, 1¼ inches, 1½ inches, 2 inches, 3 inches, and 4 inches, and other suitable sizes. In addition, the technique of the present disclosure may allow for forming a 6 foot square having a tree trunk appearance. It will be appreciated that the two outermost longitudinal cuts may be waste since the outside surface on one side of the boards, panels, sheets, veneers, and/or other products would not have a wood grain appearance. The step of squaring up the cuboid shaped structure may allow for subsequent accurate band sawing.

In some embodiments, the layers may be formed from high-density polyethylene (HDPE) thermoplastic or other suitable polymeric or plastic materials.

In addition, in other embodiments, the layers may be formed from material for making medium-density fiberboard (MDF) such as wood fibers with a binder and forming the structure such the cuboid shaped structure by applying high temperature and pressure. The wood fibers may have different colors/shades. For example, the wood fibers for the different layers may be stained to have different colors/shades. Such an MDF product according to the present disclosure may be manufactured into products having outer surfaces with a wood grain appearance thereby eliminating the need to apply an attractive laminated top surface or veneer compared to conventional MDF products.

In the above embodiments, the layers may be continuous layers or non-continuous layers, or combinations thereof. The layers may be secured or bonded to each other prior to forming into a roll and/or upon forming into a roll. The spirally wound structure may be a tightly wound spiral structure, e.g. cylindrical structure and/or cuboid structure with little or no air pockets between the layers. While the spirally wound structure may be longitudinally cut to form products having a wood grain appearance, it will be appreciated that the spirally wound structure may be cut on an angle relative to the longitudinal axis of the structure such as at about 5 degrees to about 20 degrees, at about 5 degrees to about 10 degrees, at about 3 degrees, at about 5 degrees, at about 10 degrees, at about 15 degrees, at about 20 degrees, or at other angles, or across the longitudinal axis, which will provide products having different wood grain appearances. The layers may have no fibers or contain fibers.

The structures for forming products having a wood grain appearance may be formed from heated extruded materials as noted above. In other embodiments, the overlapping layers may be resilient sheets. The resilient sheets may be at room temperature or may be heated above room temperature to provide increase flexibility. The overlapping layers or sheets may be bonded to each other such as by thermal bonding, adhesive bonding, or other suitable bonding. The formed resilient overlapping layers or sheets may be rolled into a cylindrical or cuboid structure with the overlapping portions thermally bonded, adhesively bonded, or other suitable bonding. In other embodiments, the separate resilient layers may be wound and secured to each other by thermally bonding, adhesive bonding, or other suitable bonding. In some embodiments, where an adhesive is employed to bond the layers together, the thickness of the adhesive between the layers may be such that the adhesive is so thin that it is barely or not visible to an observer in the products having a wood grain appearance, e.g., the adhesive may not represent a growth phase of the rings of a tree. In other embodiments, the adhesive may have a sufficient thickness and color operable to be visible to an observer in the products having a wood grain appearance, e.g., the adhesive represents a growth phase of the rings of a tree.

Figure 13:
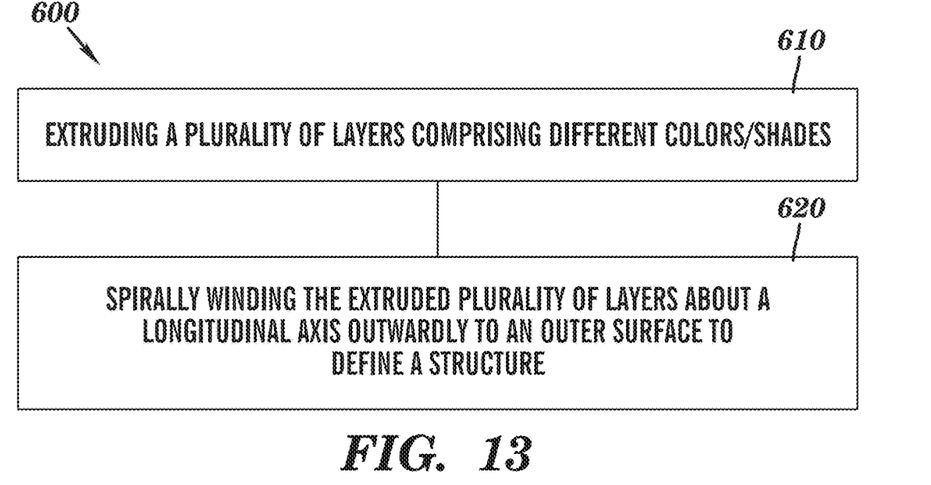
FIG. 13 is a flowchart of a method for forming a structure for use in forming products having a wood grain appearance according to an embodiment of the present disclosure.

FIG. 13 illustrates a method 600 for forming a structure for use in forming products having a wood grain appearance according to an embodiment of the present disclosure. For example, method 600 may include at 610 extruding a plurality of layers having different colors/shades, and at 620 spirally winding the extruded plurality of layers about a longitudinal axis outwardly to an outer surface to define a structure.

Figure 14:
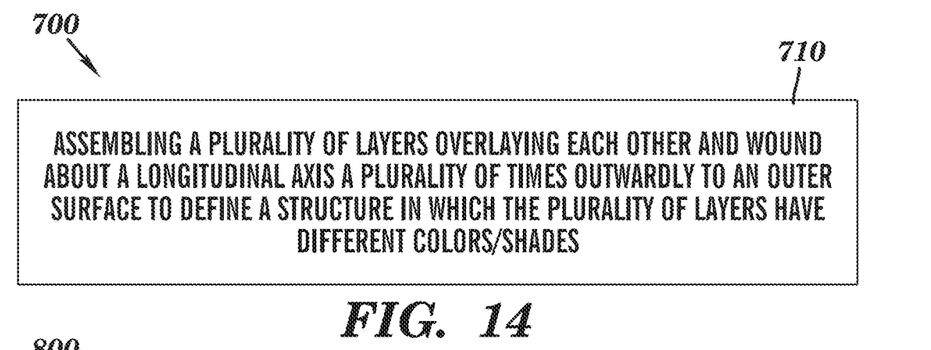
FIG. 14 is a flowchart of a method for forming structures for use in forming products having a wood grain appearance according to an embodiment of the present disclosure.

FIG. 14 illustrates a method 700 for forming a structure for use in forming products having a wood grain appearance according to an embodiment of the present disclosure. For example, method 700 may include at 710 assembling a plurality of layers overlaying each other and wound about a longitudinal axis a plurality of times outwardly to an outer surface to define the structure in which the plurality of layers have different colors/shades.

Figure 15:
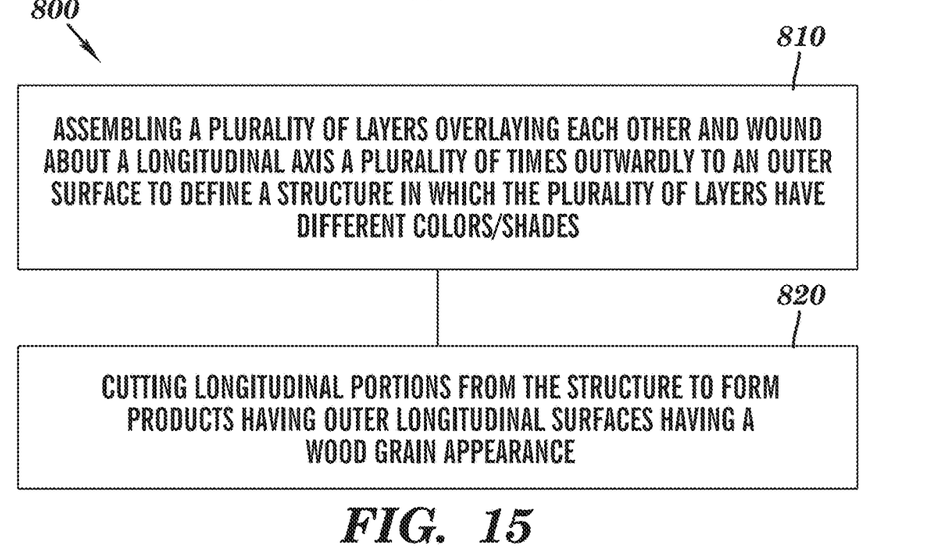
FIG. 15 is a flowchart of a method for forming products having a wood grain appearance according to an embodiment of the present disclosure.

FIG. 15 illustrates a method 800 for forming products having a wood grain appearance according to an embodiment of the present disclosure. For example, method 800 may include at 810 assembling a plurality of layers overlaying each other and wound about a longitudinal axis a plurality of times outwardly to an outer surface to define the structure, and at 820 cutting longitudinal portions from the structure to form the products having outer longitudinal surfaces having a wood grain appearance.

Figure 16:
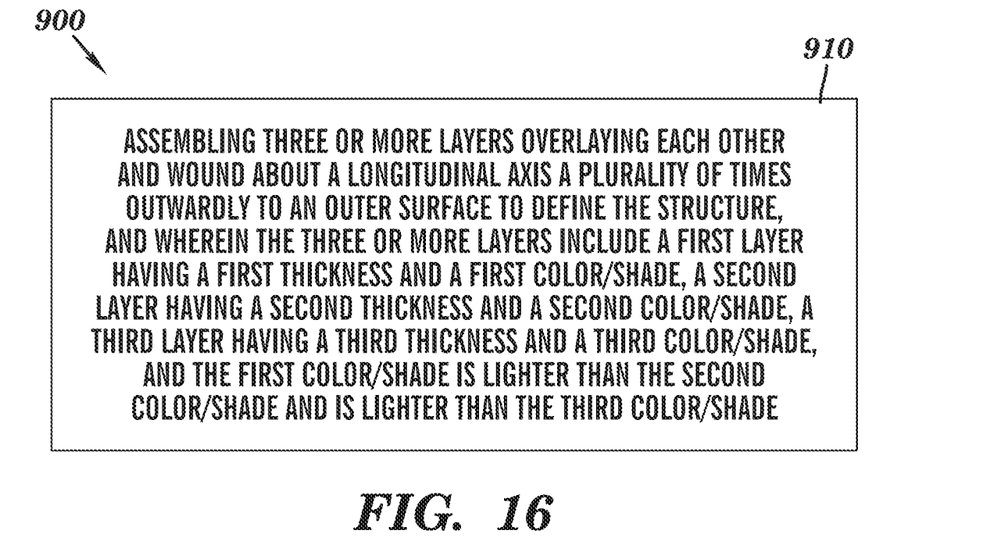
FIG. 16 is a flowchart of a method for forming structures for use in forming products having a wood grain appearance according to an embodiment of the present disclosure.

FIG. 16 illustrates a method 900 for forming a structure for use in forming products having a wood grain appearance according to an embodiment of the present disclosure. For example, method 900 may include at 910 assembling three or more layers overlaying each other and wound about a longitudinal axis a plurality of times outwardly to an outer surface to define the structure, and wherein the three or more layers include a first layer having a first thickness and a first color/shade, a second layer having a second thickness and a second color/shade, a third layer having a third thickness and a third color/shade, and the first color/shade is lighter than the second color/shade and is lighter than the third color/shade.

Figure 17:
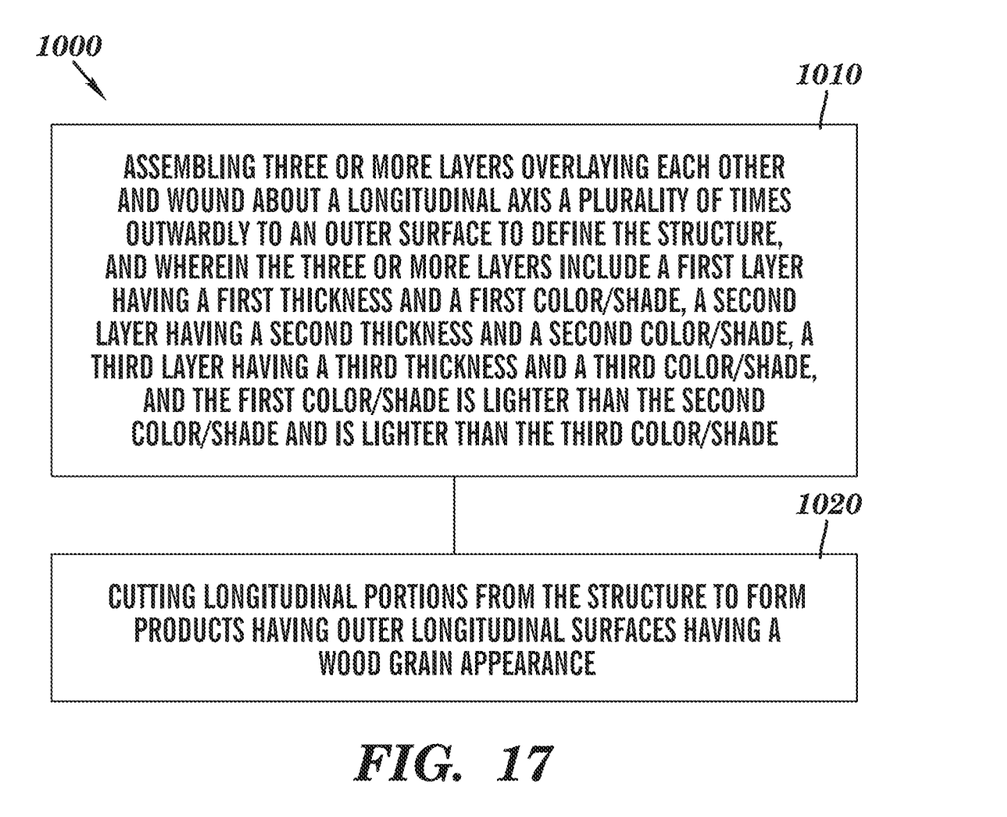
FIG. 17 is a flowchart of a method for forming products having a wood grain appearance according to an embodiment of the present disclosure.

FIG. 17 illustrates a method 1000 for forming a structure for use in forming products having a wood grain appearance according to an embodiment of the present disclosure. For example, method 1000 may include at 1010 assembling three or more layers overlaying each other and wound about a longitudinal axis a plurality of times outwardly to an outer surface to define the structure, and wherein the three or more layers include a first layer having a first thickness and a first color/shade, a second layer having a second thickness and a second color/shade, a third layer having a third thickness and a third color/shade, and the first color/shade is lighter than the second color/shade and is lighter than the third color/shade, and at 1020 cutting longitudinal portions from the structure to form the products having outer longitudinal surfaces having a wood grain appearance.

Figure 18:
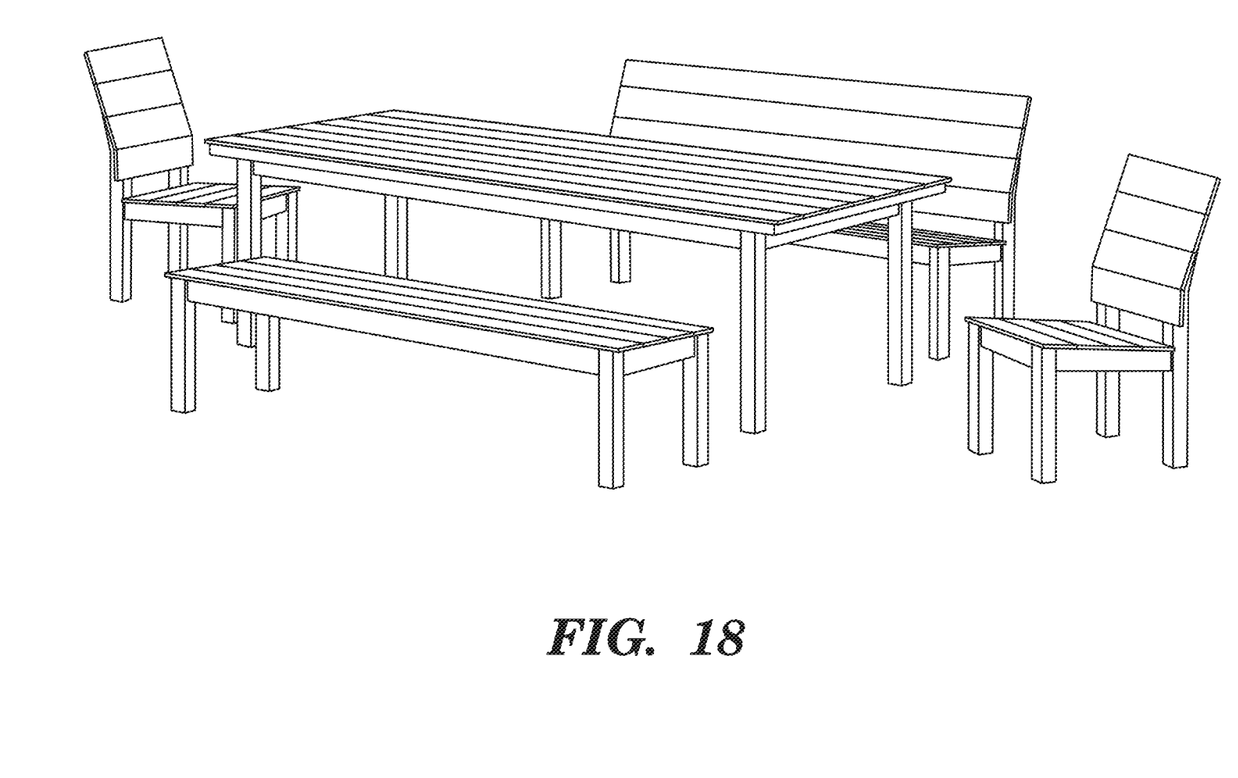
FIG. 18 is a perspective views of articles of manufacture formed from products having a wood grain appearance according to embodiments of the present disclosure.

FIG. 18 illustrates articles of manufacture formed from products having a wood grain appearance according to embodiments of the present disclosure (the articles of manufacture not being illustrated as having a wood grain appearance for ease of illustration in FIG. 18). For example, the cut portions of the structure may be manufactured into furniture which may include seats, chairs, benches, or tables. Other useful articles of manufacture may include decks, marine products, paneling, and other suitable articles of manufacture.

Advantages of the technique of the present disclosure includes forming dimensionally stable boards, panels, sheets, veneers, and/or other products having realistic outer surfaces having a wood grain appearance and realistic wood grain along cut end portions of the boards, panels, sheets, veneers, and/or other products. Such an approach provides a more realistic looking wood products compared to conventional extrusions having injected or added colors or streakers.

Such boards, panels, sheets, veneers, and/or other products, cut from a large roll, may be thicker than forming thick extruded polymeric or plastic boards which shrink to such an extent making it impractical to make extrusions that are very thick at all.

The present technique may employ existing manufacturing methods of coextruded sheets, and employ a rolling and forming process, followed by cutting process, to create a unique material product. This present approach overcomes the thickness limitations of extrusions by employing thin layers and building or forming the thin layers into a larger structure. Traditional woodworking tools may be readily applied in forming the structure into useful articles of manufacture.

From the present description, products having a wood grain appearance may be formed from a cylindrical roll of the different layers. In other embodiments, the extruded layers may be formed directly into a cuboid shaped structure.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accord-

The invention claimed is:

1. A method for forming a structure for use in forming products having a wood grain appearance, the method comprising:
   providing a plurality of layers comprising different colors/shades;
   spirally winding the provided plurality of layers about a longitudinal axis outwardly to an outer surface to define the structure; and
   deforming the spirally wound structure so that portions of the plurality of provided layers encircling the longitudinal axis comprise portions disposed at different distances from the longitudinal axis.

2. The method of claim 1 further comprising cutting longitudinal portions from the structure to form the products having outer longitudinal surfaces having the wood grain appearance.

3. The method of claim 1 wherein the providing comprises providing the plurality of layers comprising a varying thickness along a spiral length of the plurality of layers.

4. The method of claim 1 wherein the spirally winding comprises spirally winding the provided plurality of layers about the longitudinal axis outwardly to the outer surface to define a cuboid structure.

5. The method of claim 4 further comprising cutting longitudinal portions from the cuboid structure to form the products having outer longitudinal surfaces having the wood grain appearance.

6. The method of claim 1 wherein the spirally winding comprises forming a cylindrical structure, and wherein the deforming comprises pressing the cylindrical structure into a cuboid structure comprising a square or rectangular cross-section across the longitudinal axis and at least a portion of the plurality of provided layers defining a square or rectangle pattern across the longitudinal axis.

7. The method of claim 6 further comprising allowing the cuboid structure to cool wherein portions of some of the plurality of provided layers curve inwardly toward the longitudinal axis.

8. The method of claim 6 further comprising cutting longitudinal portions from the cuboid structure to form the products having outer longitudinal surfaces having the wood grain appearance.

9. The method of claim 1 wherein the plurality of layers comprises first and second provided layers, the first provided layer comprising a first thickness and a first color/shade, the second provided layer comprising a second thickness and a second color/shade, the first thickness being greater than the second thickness, and the first color/shade being lighter than the second color/shade.

10. The method of claim 1 wherein the plurality of layers comprises first, second, and third provided layers, the first provided layer comprising a first thickness and a first color/shade, the second provided layer comprising a second thickness and a second color/shade, the third provided layer comprising a third thickness and a third color/shade, the first thickness being greater than the second thickness and greater than the third thickness, and the first color/shade being lighter than the second color/shade and the third color/shade.

11. The method of claim 1 wherein the plurality of layers comprises a thickness of about ¼ inch, and one of the plurality of layers comprises a thickness of about ⅛ inch.

12. The method of claim 1 wherein the plurality of provided layers comprises a plurality of provided layers of polymeric material.

13. The method of claim 1 wherein the plurality of provided layers comprises a plurality of provided layers of wood fibers with a binder.

14. The method of claim 1 wherein the providing comprises extruding the plurality of layers comprising different colors/shades, and the spirally winding comprises spirally winding the extruded plurality of layers about a longitudinal axis outwardly to an outer surface to define the structure.

15. The method of claim 14 wherein the extruding comprises extruding the plurality of layers comprising a varying thickness along a spiral length of the plurality of layers.

16. The method of claim 14 wherein the deforming comprises deforming the structure so that portions of the plurality of extruded layers encircling the longitudinal axis comprise portions disposed at different distances from the longitudinal axis.

17. The method of claim 14 wherein the extruding comprises extruding the plurality of layers comprising a varying thickness along a spiral length of the plurality of layers, and wherein the deforming comprises deforming the structure so that portions of the plurality of extruded layers encircling the longitudinal axis comprise portions disposed at different distances from the longitudinal axis.

18. The method of claim 17 further comprising cutting longitudinal portions from the structure to form the products having outer longitudinal surfaces having the wood grain appearance.

19. The method of claim 14 wherein the spirally winding comprises spirally winding the extruded plurality of layers about the longitudinal axis outwardly to the outer surface to define a cuboid structure.

20. The method of claim 19 further comprising cutting longitudinal portions from the cuboid structure to form the products having outer longitudinal surfaces having the wood grain appearance.

21. The method of claim 14 wherein the spirally winding comprises forming a cylindrical structure, and wherein the deforming comprises pressing the cylindrical structure into a cuboid structure comprising a square or rectangular cross-section across the longitudinal axis and at least a portion of the plurality of extruded layers defining a square or rectangle pattern across the longitudinal axis.

22. The method of claim 21 further comprising allowing the cuboid structure to cool wherein portions of some of the plurality of extruded layers curve inwardly toward the longitudinal axis.

23. The method of claim 21 further comprising cutting longitudinal portions from the cuboid structure to form the products having outer longitudinal surfaces having the wood grain appearance.

24. The method of claim 14 wherein the plurality of layers comprises first and second extruded layers, the first extruded layer comprising a first thickness and a first color/shade, the second extruded layer comprising a second thickness and a second color/shade, the first thickness being greater than the second thickness, and the first color/shade being lighter than the second color/shade.

25. The method of claim 14 wherein the plurality of layers comprises first, second, and third extruded layers, the first extruded layer comprising a first thickness and a first color/shade, the second extruded layer comprising a second thickness and a second color/shade, the third extruded layer comprising a third thickness and a third color/shade, the first thickness being greater than the second thickness and greater than the third thickness, and the first color/shade being lighter than the second color/shade and the third color/shade.

26. The method of claim 14 wherein the plurality of layers comprises a thickness of about ¼ inch, and one of the plurality of layers comprises a thickness of about ⅛ inch.

27. The method of claim 14 wherein the plurality of extruded layers comprises a plurality of extruded layers of polymeric material.

28. The method of claim 14 wherein the plurality of extruded layers comprises a plurality of extruded layers of wood fibers with a binder.

29. The method of claim 14 further comprising cutting longitudinal portions from the structure to form the products having outer longitudinal surfaces having the wood grain appearance.

30. The method of claim 29 further comprising assembling a plurality of portions cut longitudinally from one or more of the structure into an article of manufacture.

31. The method of claim 30 wherein the article of manufacture comprises a seat, a chair, a bench, or a table.

32. The method of claim 2 further comprising assembling a plurality of portions cut longitudinally from one or more of the structure into an article of manufacture.

33. The method of claim 32 wherein the article of manufacture comprises a seat, a chair, a bench, or a table.

\* \* \* \* \*